United States Patent [19]

Takao et al.

[11] Patent Number: 4,820,774

[45] Date of Patent: Apr. 11, 1989

[54] ELASTOMER COMPOSITION

[75] Inventors: Hiroyoshi Takao, Chiba; Yoshio Tanimoto, Sakura; Kiyosi Ikeda, Ichihara; Masahiro Fukuyama, Chiba, all of Japan

[73] Assignee: Sumitomo Chemical Company, Limited, Osaka, Japan

[21] Appl. No.: 108,499

[22] Filed: Oct. 14, 1987

[30] Foreign Application Priority Data

Oct. 27, 1986 [JP] Japan .................. 61-256598
Oct. 27, 1986 [JP] Japan .................. 61-256599

[51] Int. Cl.$^4$ ............. C08L 23/16; C08L 23/26; C08L 23/08; C08L 33/14
[52] U.S. Cl. .................. 525/208; 525/211; 525/227; 525/913; 524/322; 524/432; 524/517
[58] Field of Search ............. 525/208, 211, 227

[56] References Cited

U.S. PATENT DOCUMENTS

| | | | |
|---|---|---|---|
| 3,833,689 | 9/1974 | Usamoto et al. | 525/227 |
| 3,849,333 | 11/1974 | Lloyd et al. | 525/227 |
| 3,915,929 | 10/1975 | Kishikawa et al. | 525/208 |
| 4,131,654 | 12/1978 | Herman et al. | 525/227 |
| 4,332,655 | 1/1982 | Berejka | 525/211 |
| 4,379,888 | 4/1983 | Yoshimura et al. | 525/211 |
| 4,555,546 | 11/1985 | Patel | 525/227 |
| 4,639,487 | 1/1987 | Hazelton et al. | 525/227 |
| 4,696,967 | 9/1987 | Shedd et al. | 525/208 |

FOREIGN PATENT DOCUMENTS 61-73751  4/1986  Japan .

Primary Examiner—Carman J. Seccuro
Attorney, Agent, or Firm—Stevens, Davis, Miller & Mosher

[57] ABSTRACT

A vulcanizable elastomer composition comprising an α-olefin copolymer comprising ethylene and an α-olefin(s) and an ethylene copolymer comprising ethylene and at least one member selected from the group consisting of acrylic and methacrylic esters, which has an excellent roll-processability and gives by vulcanization an elastomeric material having well-balanced properties in respect of resistance to heat and oil, low-temperature property and the like.

22 Claims, No Drawings

ELASTOMER COMPOSITION

The present invention relates to a vulcanizable elastomer composition, and more particularly, it relates to a vulcanizable elastomer composition comprising an α-olefin copolymer comprising ethylene and an α-olefin(s) and an ethylene copolymer comprising ethylene and at least one member selected from the group consisting of acrylic and methacrylic esters.

Recently, with the remarkable technological progress in auto, mechanical and domestic electrical equipment industries, elastomeric materials become widely used for various parts and have been required to have a wide variety of excellent properties. In order to satisfy the need, various special elastomeric materials are now being developed. Especially in the auto industry, the requirements to the properties of these elastomeric materials are very severe. For example, to the elastomeric materials used for brake hose, radiator hose and the like in an engine room, not only heat resistance but also oil resistance is strongly demanded. On the other hand, to the elastomeric materials used for oil packing or gasket, an improved flexibility at low temperatures is required as well as the resistance to heat and oil. Thus, the auto industry today eagerly seeks for elastomeric materials having well-balanced properties in respect of resistance to heat and oil, low-temperature property and the like.

A composition comprising ethylene-carboxylic acid ester-acrylic ester terpolymer and ethylene-propylene copolymer is disclosed in Japanese patent application Kokai (Laid-Open) No. 73,751,86 and this composition is improved in oil resistance and low-temperature property to some extent. However, this improvement is still insufficient and unsatisfactory and it is strongly requested to develop a material having a more improved balance of these properties.

In addition, a request for improving the roll-processability is rising now in order to improve the operation efficiency. However, there has not been obtained yet any elastomeric material having both the processability and the above-mentioned excellent physical properties.

The present inventors have made extensive research on an elastomeric material having all the properties required above.

According to the present invention, there is provided a vulcanizable elastomer composition comprising an α-olefin copolymer comprising ethylene and an α-olefin(s) (hereinafter referred to as the α-olefin copolymer) and an ethylene copolymer comprising ethylene and at least one member selected from acrylic and methacrylic esters (hereinafter referred to as the ethylene copolymer), which gives by vulcanization an elastomeric material having the well-balanced properties mentioned above.

The α-olefin copolymer used in the composition of the present invention may be a known copolymer of ethylene and at least one α-olefin, which may have copolymerized therewith one or more straight chain or cyclic monomer having a nonconjugated double bond.

The α-olefin used in the α-olefin copolymer has preferably 3-12 carbon atoms, and includes specifically propylene, 1-butene, 1-pentene, 1-hexene, 4-methyl-1-pentene, 1-octene and mixtures thereof. Among them, preferred are propylene, 1-butene and a mixture thereof, and propylene is most preferable.

The ethylene content in the α-olefin copolymer is preferably 45-95% by weight, more preferably 45-90% by weight and most preferably 45-65% by weight based on the weight of the α-olefin copolymer.

The straight chain or cyclic monomers having a nonconjugated double bond include 5-ethyl-2-norbornene, dicyclopentadiene and 1,4-hexadiene, and 5-ethyl-2-norbornene is preferred.

The α-olefin copolymer can be obtained by a known method such as solution polymerization or bulk polymerization using the so-called Ziegler-Natta catalyst, a typical example of which is a catalyst consisting of a vanadium compound and an organic aluminum compound.

The ethylene copolymer used in the composition of the present invention is a known copolymer comprising ethylene and at least one member selected from the group consisting of acrylic and methacrylic esters.

The acrylic and methacrylic esters in the ethylene copolymer are preferably those of alcohols having 1-8 carbon atoms, and includes specifically methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate, 2-ethylhexyl methacrylate and mixtures thereof. Among them, the above-mentioned acrylic esters are preferred, and methyl acrylate is most preferable.

The molar ratio of the ethylene to the sum of the acrylic and methacrylic esters is preferably 50-85:-50-15, more preferably 58-80:42-20. When the molar ratio is more than 85:15, the resulting elastomeric material has a tendency to become brittle. On the other hand, when the molar ratio is less than 50:50, the resulting elastomeric material has a tendency that the degree of crystallinity becomes high.

One or more unsaturated compounds such as unsaturated glycidyl esters, acid anhydrides and unsaturated compounds having at least one carboxyl group (hereinafter referred to as the third component) can be copolymerized with ethylene and at least one member selected from the group consisting of acrylic and methacrylic esters in the ethylene copolymer.

Specific examples of the unsaturated glycidyl esters are glycidyl acrylate, glycidyl methacrylate, diglycidyl itaconate, triglycidydl butene tricarboxylate, glycidyl p-styrene carboxylate and the like as disclosed in Japanese Patent Publication No. 45,085/71.

Specific examples of the unsaturated compound having a carboxyl group(s) are acrylic acid, methacrylic acid, maleic acid, half ester of maleic acid and the like.

Specific examples of the acid anhydride are maleic anhydride and the like.

The third component may be used in an amount of preferably 0.05-5 mole%, more preferably 0.1-3 mole%, based on the sum of moles of the ethylene and the acrylic and methacrylic esters.

Also, comonomers other than the above-mentioned compounds may be copolymerized with ethylene and at least one member selected from the group consisting of acrylic and methacrylic esters in the ethylene copolymer. Specific examples thereof are isobutylene, styrene, derivatives of styrene, vinyl acetate, halogenated olefins such as tetrafluoroethylene and hexafluoropropylene and the like.

The ethylene copolymer used in the composition of the present invention can be obtained by a known method such as bulk polymerization with a free radical initiator, emulsion polymerization or solution polymerization. A typical polymerization method is disclosed in Japanese Patent Publication No. 45,085/71. For example, the polymerization can be effected in the presence of a free radical-generating initiator at a pressure of not less than 500 kg/cm$^2$ at a temperature of 40°–300° C.

The ethylene copolymer used in the composition of the present invention has preferably a melt index of 0.01–500 g/10 min., more preferably 0.01–50 g/10 min., as measured at 190° C. in accordance with JIS K6791.

The vulcanizable elastomer composition of the present invention can be obtained by blending and kneading the α-olefin copolymer and the ethylene copolymer by means of a kneader such as a roll mill, a Bunbury mixer or the like usually used in rubber industry.

In the vulcanizable elastomer composition of the present invention, the weight ratio of the α-olefin copolymer to the ethylene copolymer is 99-1:1-99, preferably 90-10:10-90, more preferably 75-25:25-75.

If necessary, additives known in rubber industry such as vulcanization accelerators, processing aids, zinc oxide, stearic acid, reinforcing agents, fillers, softeners, anti-aging agents, anti-foaming agents and the like may be added to the vulcanizable elastomer composition of the present invention.

This invention is further illustrated by the following Examples and Comparative Examples, which should not be interpreted to limit the scope of the invention.

EXAMPLES 1–10 AND COMPARATIVE EXAMPLES 1–4

Elastomer compositions were prepared by blending the components shown in Table 1 in the amounts shown in Table 1. Each of the elastomer compositions was kneaded on a roll mill. The resulting compositions other than the composition of Comparative Example 4 were vulcanized at 170° C. for 10 minutes by means of a vapor press to obtain elastomeric materials. The composition of Comparative Example 4 was vulcanized at 150° C. for 60 minutes by means of a vapor press to obtain an elastomeric material.

Tensile properties, hardness, oil resistance, low-temperature property and ozone resistance of the elastomeric materials were measured in accordance with JIS K6301.

The oil resistance was indicated by a degree of volume swell with the No. 3 oil of JIS at 150° C. after 70 hours.

The ozone resistance was indicated by "O" and "X" ("O" means that no crack was generated and the ozone resistance was good and "X" means that cracks were generated and the ozone resistance was bad) based on the observation of the surface of the specimen which had suffered a 0–30% dynamic mechanical test for 20 days in an atmosphere having an ozone concentration of 100 pphm.

The roll-processability of the elastomer composition was evaluated as follows:

Rolls having an 8-inch diameter, the surfaces of which were maintained at 50°±2° C., were used. The copolymers, stearic acid, carbon black and other additives were added thereto in this order. Then, kneading was carried out for 5 minutes and the winding and adhering of the composition to the rolls were observed. The processability was indicated by "O" and "X" which have the following meansings:

O: the processability was good since the composition was wound around the rolls well and the adhesion thereof to the rolls was appropriate.

X: the processability was bad since the composition was bagged about the rolls or adhered too strongly to the rolls.

It is quite evident that the elastomeric materials of the Examples had resistance to oil and heat and low-temperature property in good balance as compared with those to the Comparative Examples. It is also clear that the elastomer compositions of the Examples had excellent roll-processabilities as compared with those of the Comparative Examples.

TABLE 1

| | | Examples | | | | | | | | | | Comparative Examples | | | |
|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 |
| Amount of Component (parts by weight) | Esprene 201*[1] | 90 | 75 | 25 | 10 | 75 | 45 | — | — | — | — | 100 | — | — | — |
| | Esprene 501A*[2] | — | — | — | — | — | — | 55 | 25 | 60 | 40 | — | — | — | 40 |
| | Ethylene Copolymer A*[3] | 10 | 25 | 75 | 90 | — | — | 45 | 75 | — | — | — | 100 | — | — |
| | Ethylene Copolymer B*[3] | — | — | — | — | 25 | 55 | — | — | 40 | 60 | — | — | 100 | — |
| | Neoprene WRT*[4] | — | — | — | — | — | — | — | — | — | — | — | — | — | 60 |
| | FEF Carbon | 40 | 40 | 40 | 40 | 40 | 40 | 40 | 40 | 40 | 40 | 40 | 40 | 40 | 40 |
| | Stearic acid | 1 | 1 | 1 | 1 | 1 | 1 | 1 | 1 | 1 | 1 | 1 | 1 | 1 | 1.5 |
| | Zinc oxide | — | — | — | — | — | — | — | — | — | — | — | — | — | 5 |
| | Naguard ® 445*[5] | 1 | 1 | 1 | 1 | 1 | 1 | 1 | 1 | 1 | 1 | 1 | 1 | 1 | — |
| | Antigene ® 3C*[6] | — | — | — | — | — | — | — | — | — | — | — | — | — | 1.2 |
| | Soxinol ® CZ*[7] | — | — | — | — | — | — | — | — | — | — | — | — | — | 2.5 |
| | Soxinol ® 22*[7] | — | — | — | — | — | — | — | — | — | — | — | — | — | 0.5 |
| | Sulfur | — | — | — | — | — | — | — | — | — | — | — | — | — | 0.7 |
| | Magnesium oxide | — | — | — | — | — | — | — | — | — | — | — | — | — | 4 |
| | Dicumyl peroxide | 2.5 | 2.5 | 2.5 | 2.5 | 2.5 | 2.5 | 2.5 | 2.5 | 2.5 | 2.5 | 2.5 | 2.5 | 2.5 | — |
| | Acrylic Ester ED*[8] | 2 | 2 | 2 | 2 | 2 | 2 | 2 | 2 | 2 | 2 | 2 | 2 | 2 | — |
| Tensile Properties of Elastomeric Material | Tensile Strength at Break (kgf/cm$^2$) | 140 | 123 | 158 | 170 | 130 | 141 | 135 | 162 | 138 | 165 | 147 | 189 | 164 | 150 |
| | Elongation at Break (%) | 400 | 380 | 340 | 350 | 360 | 360 | 360 | 380 | 370 | 380 | 430 | 360 | 340 | 300 |
| Hardness of Elastomeric Material Measured by A-type Hardness Meter | | 61 | 64 | 64 | 63 | 62 | 66 | 66 | 65 | 62 | 66 | 61 | 62 | 64 | 62 |
| Oil Resistance of Elastomeric Material | Volume Swell (%) | 180 | 161 | 112 | 110 | 165 | 130 | 138 | 110 | 42 | 125 | 202 | 105 | 95 | 45 |
| Low-Temperature Property of | T$_2$ (°C.) | −19 | −17 | −14 | −14 | −17 | −15 | −16 | −14 | −17 | −16 | −20 | −12 | −12 | −18 |
| | T$_{100}$ (°C.) | −58 | −56 | −43 | −38 | −55 | −49 | −49 | −43 | −50 | −49 | −60 | −32 | −32 | −58 |

TABLE 1-continued

| Elastomeric Material (Gehman Tortion Test) | | | | | | | | | | | | | | |
|---|---|---|---|---|---|---|---|---|---|---|---|---|---|---|
| Ozone Resistance of Elastomeric Material | O | O | O | O | O | O | O | O | O | O | O | O | O | X |
| Roll-Processability of Elastomer Composition | O | O | O | O | O | O | O | O | O | O | X | X | X | O |

Note:
*¹ A trade name of Sumitomo Chemical Co., Ltd. for an ethylene-propylene copolymer rubber.
*² A trade name of Sumitomo Chemical Co., Ltd. for an ethylene-propylene-ethylidenenorbornene copolymer rubber.
*³ Compositions and melt indexes of the ethylene copolymers are as shown in the following Table:

| Ethylene Copolymer | | A | B |
|---|---|---|---|
| Composition (mole %) | Ethylene | 74 | 65.2 |
| | Methyl Acrylate | 26 | 34 |
| | Glycidyl Methacrylate | — | 0.8 |
| Melt Index (g/10 min.) | | 5 | 4 |

Melt indexes were measured at 190° C. in accordance with JIS K6791.
*⁴A trade name of Showa Neoprene Co., Ltd. for a chloroprene rubber.
*⁵A trade name of Uniroyal Incorp. for bis(2'-phenyl-4-propylphenyl)amine as an anti-aging agent.
*⁶A trade name of Sumitomo Chemical Co., Ltd. for N—phenyl-N'—isopropyl-p-phenylenediamine as an anti-aging agent.
*⁷Trade names of Sumitomo Chemical Co., Ltd. for N—cyclohexyl benzothiazyl-sulfenamide (CZ) and 2-Mercaptoimidazoline (22) as vulcanization accelerators.
*⁸A trade name of Mitsubishi Rayon Co., Ltd. for ethylene dimethacrylate.

What is claimed is:

1. A vulcanizable elastomer composition comprising 1-99% by weight of an alpha-olefin copolymer rubber comprising ethylene and at least one alpha-olefin and 99-1% by weight of an ethylene copolymer consisting essentially of ethylene, at least one member selected from the group consisting of acrylic and methacrylic esters, and at least one unsaturated glycidyl ester.

2. A vulcanizable elastomer composition according to claim 1, wherein the α-olefin copolymer rubber is contained in a proportion of 10-90% by weight and the ethylene copolymer is contained in a proportion of 90-10% by weight.

3. A vulcanizable elastomer composition according to claim 1, wherein the α-olefin copolymer rubber is contained in a proportion of 25-75% by weight and the ethylene copolymer is contained in a proportion of 75-25% by weight.

4. A vulcanizable elastomer composition according to any one of claims 2, 3 or 1, wherein the molar ratio of the ethylene to the sum of the acrylic and methacrylic esters in the ethylene copolymer is 50-85:50-15 and the content of the unsaturated glycidyl ester is 0.05-4 mole% based on the sum of moles of the ethylene and the acrylic and methacrylic ester in the ethylene copolymer.

5. A vulcanizable elastomer composition according to any one of claims 2, 3 or 1, wherein the molar ratio of the ethylene of the sum of the acrylic and methylacrylic esters in the ethylene copolymer is 58-80:42-20 and the content of the unsaturated glycidyl ester is 0.1-3 mole% based on the sum of moles of the ethylene and the acrylic and methacrylic ester in the ethylene copolymer.

6. A vulcanizable elastomer composition according to claim 1, wherein the ethylene content in the α-olefin copolymer rubber is 45-65% by weight based on the weight of the α-olefin copolymer rubber.

7. A vulcanizable elastomer composition according to any one of claims 2, 3 or 1, wherein at least one straight chain or cyclic monomer having a nonconjugated double bond is copolymeriized with the ethylene and α-olefin(s) in the α-olefin copolymer rubber.

8. A vulcanizable elastomer composition according to claim 7, wherein the straight chain or cyclic monomer is selected from the group consisting of 5-ethylidene-2-norbornene, dicyclopentadiene and 1,4-hexadiene.

9. A vulcanizable elastomer composition according to claim 7, wherein the straight chain or cyclic monomer is 5-ethylidene-2-norbornene.

10. A vulcanizable elastomer composition according to any one of claims 2, 3 or 1, wherein the α-olefin in the α-olefin copolymer rubber is at least one α-olefin having 3-12 carbon atoms.

11. A vulcanizable elastomer composition according to claim 10, wherein the at least one α-olefin is selected from the group consisting of propylene, 1-butene, 1-pentene, 1-hexene, 4-methyl-1-pentene and 1-octene.

12. A vulcanizable elastomer composition according to claim 10, wherein the at least one α-olefin is selected from the group consisting of propylene and 1-butene.

13. A vulcanizable elastomer composition according to claim 10, wherein the at least one α-olefin is propylene.

14. A vulcanizable elastomer composition according to claim 1, wherein the third component is glycidyl methacrylate.

15. A vulcanizable elastomer composition according to any one of claims 2, 3 or 1, wherein the acrylic and methacrylic esters are of alcohols having 1-8 carbon atoms.

16. A vulcanizable elastomer composition according to claim 15, wherein the acrylic and methacrylic esters are methyl acrylate, methyl methacrylate, ethyl acrylate, ethyl methacrylate, n-butyl acrylate, n-butyl methacrylate, tert-butyl acrylate, tert-butyl methacrylate, 2-ethylhexyl acrylate and 2-ethylhexyl methacrylate.

17. A vulcanizable elastomer composition according to any one of claims 2, 3 or 1, wherein the ethylene copolymer has a melt index of 0.01-500 g/10 min as measured at 190° C.

18. A vulcanizable elastomer composition according to any one of claims 2, 3 or 1, wherein the ethylene copolymer has a melt index of 0.01-50 g/10 min as measured at 190° C.

19. A vulcanizable elastomer composition according to any one of claim 2, 3 or 1, which further comprises additives selected from vulcanization accelerators, processing aids, zinc oxide, stearic acid, reinforcing agents, fillers, softeners, anti-aging agents and anti-foaming agents.

20. An elastomeric material obtainable by subjecting the vulcanizable elastomer composition according to any one of claims 2, 3 or 1 to vulcanization.

21. A vulcanizable elastomer composition according to claim 15, wherein the ethylene copolymer consists essentially of ethylene, at least one acrylic ester selected from the group consisting of methyl acrylate, ethyl acrylate, n-butyl acrylate, tert-butyl acrylate and 2-ethylhexyl acrylate; and glycidyl methacrylate.

22. A vulcanizable elastomer composition according to claim 15, wherein the ethylene copolymer consists of ethylene, methyl acrylate and glycidyl methacrylate.

* * * * *